US009995826B2

(12) United States Patent
Nagano et al.

(10) Patent No.: US 9,995,826 B2
(45) Date of Patent: Jun. 12, 2018

(54) ELECTRONIC DISTANCE METER

(71) Applicant: Kabushiki Kaisha TOPCON, Tokyo (JP)

(72) Inventors: Shigenori Nagano, Tokyo (JP); Yasushi Tanaka, Tokyo (JP); Kenichiro Yoshino, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 199 days.

(21) Appl. No.: 14/747,072

(22) Filed: Jun. 23, 2015

(65) Prior Publication Data

US 2015/0378021 A1 Dec. 31, 2015

(30) Foreign Application Priority Data

Jun. 26, 2014 (JP) .................................. 2014-131914

(51) Int. Cl.
*G01S 17/10* (2006.01)
*G01S 7/481* (2006.01)
*G01S 7/497* (2006.01)
*G01S 7/486* (2006.01)

(52) U.S. Cl.
CPC .............. *G01S 17/10* (2013.01); *G01S 7/486* (2013.01); *G01S 7/4818* (2013.01); *G01S 7/497* (2013.01)

(58) Field of Classification Search
CPC ........ G01S 7/486; G01S 7/497; G01S 7/4818; G01S 17/10
USPC ........................................................ 356/5.01
See application file for complete search history.

(56) References Cited

U.S. PATENT DOCUMENTS

| | | | |
|---|---|---|---|
| 4,201,447 | A | 5/1980 | Thompson et al. |
| 4,692,023 | A | 9/1987 | Ohtomo et al. |
| 5,457,759 | A | 10/1995 | Kalonji et al. |
| 2008/0240653 | A1 | 10/2008 | King et al. |
| 2009/0195770 | A1 | 8/2009 | Satzky et al. |
| 2013/0003040 | A1 | 1/2013 | Yoshino et al. |
| 2014/0168631 | A1 | 6/2014 | Haslim et al. |

(Continued)

FOREIGN PATENT DOCUMENTS

| | | |
|---|---|---|
| CN | 101277153 A | 10/2008 |
| DE | 3617799 A1 | 12/1987 |
| DE | 10 2008 018927 A1 | 11/2009 |

(Continued)

OTHER PUBLICATIONS

European Search Report dated Nov. 3, 2015, issued for the corresponding European patent application No. 15173165.0.

(Continued)

*Primary Examiner* — Daniel L Murphy
(74) *Attorney, Agent, or Firm* — Locke Lord LLP

(57) ABSTRACT

An electronic distance meter includes an optical unit which emits light to a target object and receives the light reflected by the target object with a light receiving element, a measuring unit which calculates a length of round-trip time taken for the light to make a round trip to the target object and measures a distance to the target object according to the round-trip time of the received light, a light receiving system which receives and condenses the light reflected by the target object, and an optical guide which guides the light condensed by the light receiving element to the light receiving system, including a multi-mode graded index fiber and a multi-mode step index fiber coupled with each other.

4 Claims, 12 Drawing Sheets

(56) References Cited

U.S. PATENT DOCUMENTS

2014/0301707 A1* 10/2014 Sisto ................ G02B 6/14
385/124

FOREIGN PATENT DOCUMENTS

| JP | 2007-003333 A | 1/2007 |
| JP | 2013-011558 A | 1/2013 |

OTHER PUBLICATIONS

Office Action dated Apr. 5, 2017, issued for the corresponding Chinese patent application 201510336412.7.

* cited by examiner

FIRST EXAMPLE

SECOND EXAMPLE

FIRST EXAMPLE

THIRD EXAMPLE

FIG.10A    FIRST EXAMPLE
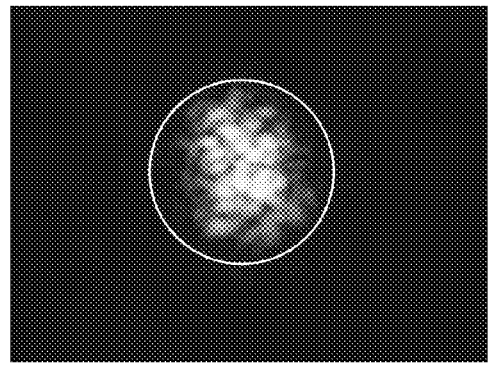
FIG.10B    FOURTH EXAMPLE
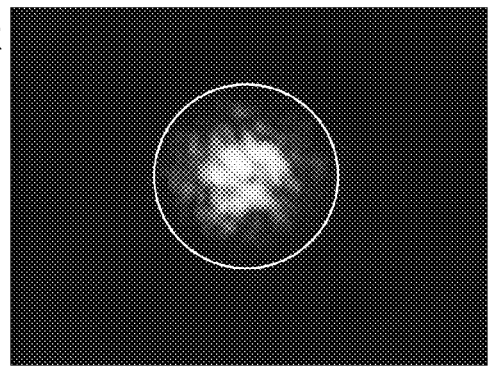
FIG.10C    FIFTH EXAMPLE
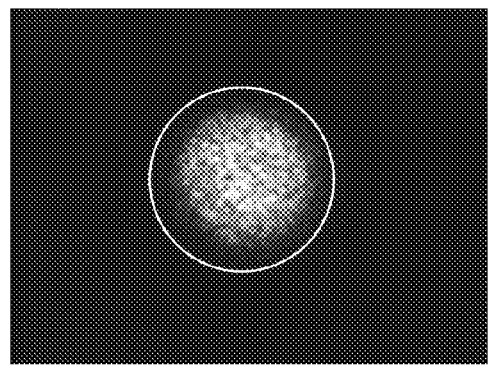
FIG.10D    SIXTH EXAMPLE
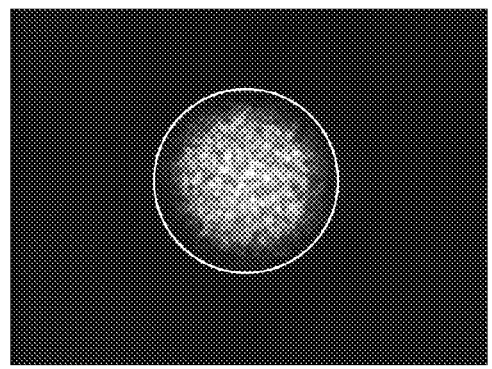

FIG.11A  FIRST EXAMPLE
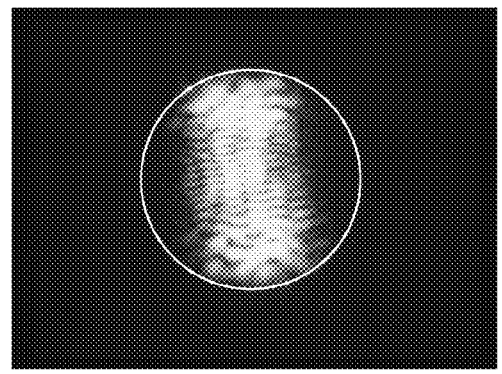
FIG.11B  FOURTH EXAMPLE
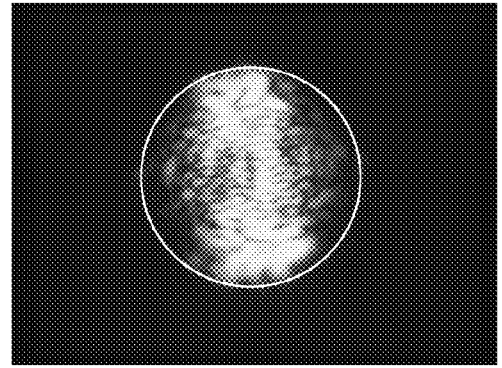
FIG.11C  FIFTH EXAMPLE
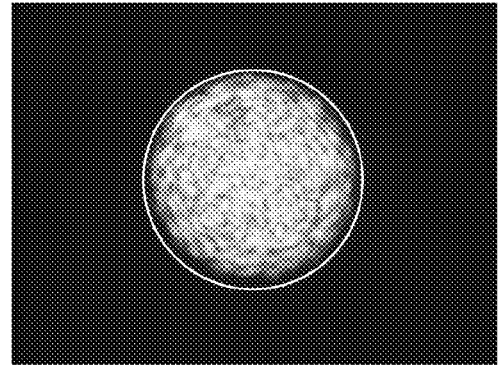
FIG.11D  SIXTH EXAMPLE
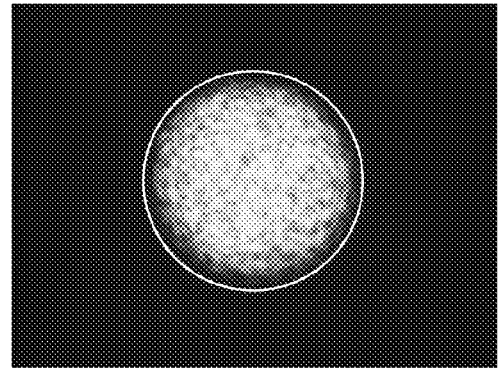

LENGTH 500mm

LENGTH 400mm

LENGTH 300mm

LENGTH 200mm

LENGTH 100mm

LENGTH 50mm

LENGTH 40mm

LENGTH 30mm

LENGTH 20mm

ELECTRONIC DISTANCE METER

CROSS-REFERENCE TO RELATED APPLICATION

The present application is based on and claims priority to Japanese patent application No. 2014-131914, filed Jun. 26, 2014, the disclosure of which is hereby incorporated by reference herein in its entirety.

BACKGROUND

1. Technical Field

The present invention relates to an electronic distance meter which irradiates a target object with light to measure a distance to a target object.

2. Description of Related Art

Japanese Laid-open Patent Application Publication No. 2013-11558, for example, discloses an electronic distance meter which irradiates a target object with pulsed light to measure the distance to a target object from a round-trip time taken from the light irradiation to the return of reflected pulsed light. Such an electronic distance meter irradiates a target object with pulsed light and receives reflected pulsed light diffused by the target object with a light-receiving element to obtain the round-trip time of the pulsed light. In view of improving measuring accuracy and finding accurate round-trip time, it is preferable that the waveform of the irradiated pulsed light match that of the reflected pulsed light. For this purpose, the electronic distance meter uses a multi-mode graded index fiber (GI fiber) which can prevent a change in waveforms over long transmission distances, to transmit the reflected pulsed light received by a light receiving system to a light receiving element.

If a target object is, for example, a reflecting prism reflecting an extremely large peak power of pulsed light, the light receiving element of the electronic distance meter will receive the reflected pulsed light having a waveform unchanged via the GI fiber. This leads to degrading a light receiving signal output from the light receiving element in accordance with the reflected pulsed light. Thereby, the electronic distance meter may not be able to accurately calculate the round-trip time and accurately measure the distance to the target object.

SUMMARY

The present invention aims to provide an electronic distance meter which can deal with an extremely large peak power of reflected light and precisely measure a distance to a target object.

According to one embodiment of the present invention, an electronic distance meter includes an optical unit which emits light to a target object and receives the light reflected by the target object with a light receiving element, a measuring unit which calculates a length of round-trip time taken for the light to make a round trip to the target object and measures a distance to the target object according to the round-trip time of the received light, a light receiving system which receives and condenses the light reflected by the target object, and an optical guide which guides the light condensed by the light receiving element to the light receiving system, including a multi-mode graded index fiber and a multi-mode step index fiber coupled with each other.

BRIEF DESCRIPTION OF DRAWINGS

FIGS. 10A to 10D show the images of first, and fourth to sixth examples captured by the imaging unit 61 of the experimental device 50 when central positions of the examples are collimated, respectively.

FIGS. 11A to 11D show the images of the first and fourth to sixth examples captured by the imaging unit 61 of the experimental device 50 when the collimated positions are shifted to gain a largest amount of light, respectively.

DETAILED DESCRIPTION

Hereinafter, an electronic distance meter according to one embodiment of the present invention will be described referring to the accompanying drawings.

Figure 1:
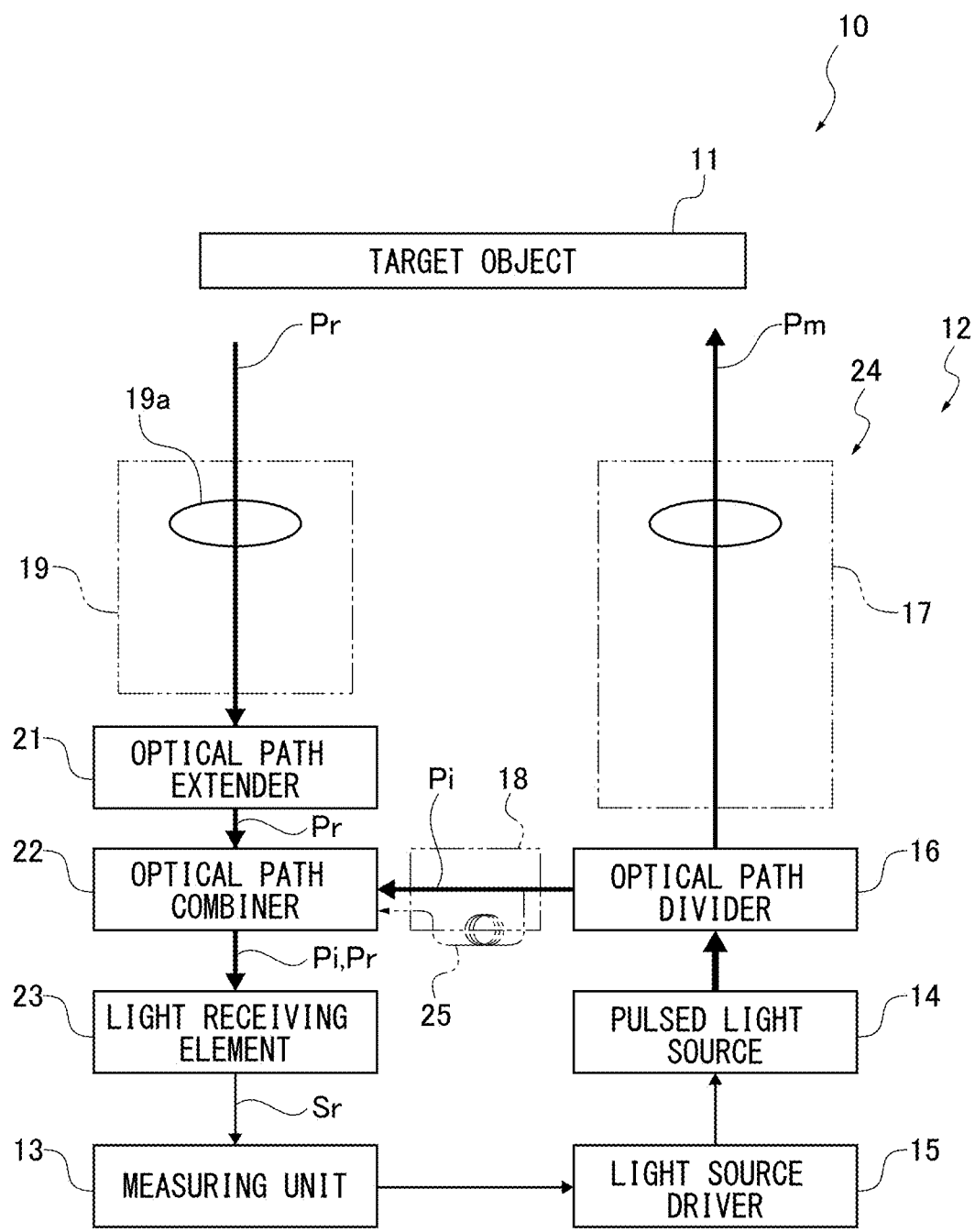
FIG. 1 schematically shows the structure of an electronic distance meter 10 according to one embodiment of the present invention by way of example.

First, one example of the structure of an electronic distance meter 10 is schematically described. As shown in FIG. 1, the electronic distance meter irradiates a target object 11 with pulsed light Pm and receives reflected pulsed light Pr diffused by the target object to obtain a round-trip time from the irradiation of the pulsed light Pm to the receipt of the reflected pulsed light Pr and measure the distance to the target object 11. The target object 11 can be various objects including furniture or interior equipment in indoor environments or structures as a building and a tunnel, trees, or landforms in outdoor environments.

The electronic distance meter 10 includes an optical unit 12 and a measuring unit 13 accommodated in a not-shown housing. The optical unit 12 is configured to emit the pulsed light Pm and receive the reflected pulsed light Pr diffused by the target object 11. The measuring unit 13 is configured to calculate the round-trip time of the pulsed light from the emitted pulsed light Pm and the reflected pulsed light Pr received by the optical unit 12 and measure the distance to the target object 11. The optical unit 12 includes a pulsed light source 14, a light source driver 15, an optical path divider 16, a projection system 17, an internal reference optical path 18, a light receiving system 19, an optical path extender 21, an optical path combiner 22, and a light receiving element 23.

The pulsed light source 14 emits a pulsed laser beam to measure the distance to the target object 11 in the present embodiment, upon receiving a drive signal from the light source driver 15. The light source driver 15 is driven by a pulse emission light signal from the measuring unit 13 to control the pulsed light source 14 to emit a large amount of pulsed light in a short pulse width (short pulse and high peak), as later described. In the present embodiment the pulse width of the pulsed light from the pulsed light source 14 is set to 1 nsec by way of example. The optical path divider 16 is provided in a traveling direction of the pulsed light from the pulsed light source 14.

The optical path divider 16 divides the optical path from the pulsed light source 14 into one to the projection system 17 and the other to the internal reference optical path 18. The pulsed light traveling to the projection system 17 becomes the pulsed light Pm irradiating the target object 11 and the pulsed light traveling to the internal reference optical path 18 becomes reference pulsed light Pi. Thus, the optical path divider 16 functions to divide the pulsed light into the pulsed light Pm and reference pulsed light Pi and guide them to the projection system 17 and the internal reference optical path 18, respectively. The optical path divider 16 can be formed of an optical element such as a beam splitter.

The projection system 17 forms an optical path to emit the pulsed light Pm to the target object 11. The projection system 17 includes at least one optical element to adjust the pulsed light Pm into a certain shape, for example, parallel flux, to be able to two-dimensionally deflect the exit axis of the adjusted pulsed light Pm for scanning. The exit axis can be deflected by changing the orientation of the projection system 17 or using a scanning mirror. The projection system 17 can be arbitrarily structured as long as it can emit the pulsed light Pm to the target object 11, and should not be limited to the above example.

The internal reference optical path 18 is for guiding the other pulsed light as the reference pulsed light Pi not to the target object 11 but to the light receiving element 23. In the present embodiment the internal reference optical path 18 is made of an optical fiber for inner optical path. The internal reference optical path 18 can be arbitrarily structured as long as it can guide the reference pulsed light Pi to the light receiving element 23, and should not be limited to the above example.

The light receiving system 19 forms an optical path through which the reflected pulsed light Pr is guided to the light receiving element 23 via the optical path extender 21. The light receiving system 19 and the projection system 17 form a measuring optical path 24. The light receiving system 19 is made of one or more optical elements including an objective lens 19a which receives the reflected pulsed light Pr from a scanning direction, to collect the reflected pulsed light Pr on a focal position. The light receiving system 19 can two-dimensionally change or deflect the optical axis to receive the reflected pulsed light Pr and be structured same as the projection system 17. The projection system 17 and the light receiving system 19 can share a part or all of the optical elements including the objective lens 19a or the light receiving system 19 can be made of a different optical element. The structure of the light receiving system 19 can be arbitrarily decided as long as it can receive the reflected pulsed light Pr from the target object 11, and should not be limited to the above example.

The optical path extender 21 delays time at which the reflected pulsed light Pr reaches the light receiving element 23 from the light receiving system 19 for the purpose of making a difference in time for the reference pulsed light Pi to reach the light receiving element 23 via the internal reference optical path 18 and for the reflected pulsed light Pr to reach the light receiving element 23 via the light receiving system 19. Thereby, it is made possible to measure distances using a light receiving signal Sr as electric signal from the light receiving element 23 without switching optical paths. The optical path extender 21 thus extends the optical path length from the light receiving system 19 to the light receiving element 23 to guide the reflected pulsed light Pr with a delay. It is an optical guide and forms an optical guide path through which the reflected pulsed light Pr is guided from the light receiving system 19 to light receiving element 23, and emits the reflected pulsed light Pr to the optical path combiner 22. The structure of the optical path extender 21 will be described later.

The optical path combiner 22 functions to guide both the reflected pulsed light Pr and the reference pulsed light Pi to the light receiving element 23. Thus, it combines the two optical paths, one from the light receiving system 19 via the optical path extender 21 and the other through the internal reference optical path 18. In the present embodiment the optical path combiner 22 includes a half mirror as a first optical element and optical elements corresponding to the optical paths. That is, a collimator element corresponding to the optical path extender 21 is provided to convert the reflected pulsed light Pr into parallel light. The parallel light transmits through the half mirror and is condensed by a condenser element and guided to the light receiving element 23. Likewise, another collimator element corresponding to the internal reference optical path 18 is provided to convert the reference pulsed light Pi into parallel light. The parallel light transmits through the half mirror and is condensed by the condenser element and guided to the light receiving element 23. The condenser element is provided between the half mirror and the light receiving element 23 for both of the optical paths.

The light receiving element 23 receives the reflected pulsed light Pr and the reference pulsed light Pi from the optical path combiner 22 and photoelectrically converts them to output a light receiving signal Sr to the measuring unit 13 in accordance with the peak power of received light. The light receiving element 23 can include a photo diode, for example. It is preferable to use a highly sensitive light receiving element such as an APD (Avalanche Photo Diode) if the peak powers of the reflected pulsed light Pr and the reference pulsed light Pi are very small.

The measuring unit 13 outputs a pulse emission light signal to the light source driver 15 to control the pulsed light source 14 to turn on. The measuring unit 13 also receives the light receiving signal Sr of the reference pulsed light Pi and the light receiving signal Sr of the reflected pulsed light Pr from the light receiving element 23, finds the round-trip time from the light receiving signals, and calculates the distance to the target object 11.

Next, the distance measurement of the electronic distance meter 10 is schematically described. The measuring unit 13 controls the pulsed light source 14 to emit pulsed light via the light source driver 15 for measuring the distance. A part of the pulsed light travels to the projection system 17 through the optical path divider 16 and emits as the pulsed light Pm to the target object 11. The target object 11 reflects the pulsed light Pm as the reflected pulsed light Pr. The reflected pulsed light Pr is incident on the light receiving system 19, delayed via the optical path extender 21 and received by the light receiving element 23 through the optical path combiner 22. The light receiving element 23 outputs the light receiving signal Sr to the measuring unit 13 in accordance with the received reflected pulsed light Pr.

Another part of the pulsed light from the pulsed light source 14 travels through the optical path divider 16 and the internal reference optical path 18 to become the reference pulsed light Pi. The reference pulsed light Pi is received by the light receiving element 23 through the optical path combiner 22. The light receiving element 23 outputs the light receiving signal Sr to the measuring unit 13 in accordance with the received reflected pulsed light Pi.

The measuring unit 13 finds time at which the reflected pulsed light Pr and reference pulsed light Pi are each received, and calculates a difference in time between the two lights. The difference in time represents the round-trip time for which the pulsed light makes a round trip between the electronic distance meter 10 and the target object 11. The measuring unit 13 calculates the distance to the target object 11 on the basis of the difference in time and speed of light. The details of how to calculate the light receiving time, the difference in time and the distance are known so that a description thereof is omitted. A drift of the light receiving element 23 or a detector circuit for processing the light receiving signal Sr, for example, may cause a measuring error and affect the calculation of the distance to the target object 11 in general. However, the measuring unit 13 acquires the difference in time between the reference pulsed light Pi and the reflected pulsed light Pr, which can negate the drift of a detector circuit. Accordingly, it can accurately calculate the distance.

The peak power of the reflected pulsed light Pr varies depending on a measuring distance or the distance to the target object 11. In view of this, another internal reference optical path 25 branching from the internal reference optical path 18 can be additionally provided. The internal reference optical path 25 is intended for correcting a delay due to a change in the peak power of the reference pulsed light Pi and guiding divided reference pulsed light Pi to the light receiving element 23 with a delay. In this case the optical path combiner 22 guides the delayed reference pulsed light Pi to the light receiving element 23 in addition to the reflected pulsed light Pr from the optical path extender 21 and the reference pulsed light Pi from the internal reference optical path 18. For this purpose, the optical path combiner 22 further includes a second optical element such as a half mirror through which the reference pulsed light Pi from the internal reference optical path 25 transmits to the first optical element and which reflects the reference pulsed light Pi from the internal reference optical path 18 to the first optical element. Thus, the first optical element has the reflected pulsed light Pr from the optical path extender 21 transmit to the light receiving element 23 and reflects the reference pulsed light Pi from the internal reference optical paths 18 and 25 to the light receiving element 23.

Next, the features of the electronic distance meter 10 according to the present embodiment are described, referring to FIG. 2 to FIG. 15. The electronic distance meter 10 includes the optical path extender 21 made of a multi-mode graded index fiber (GI fiber) 26 and a multi-mode step index fiber (SI fiber) 27 coupled with each other, referring to FIG. 2.

Figure 3:
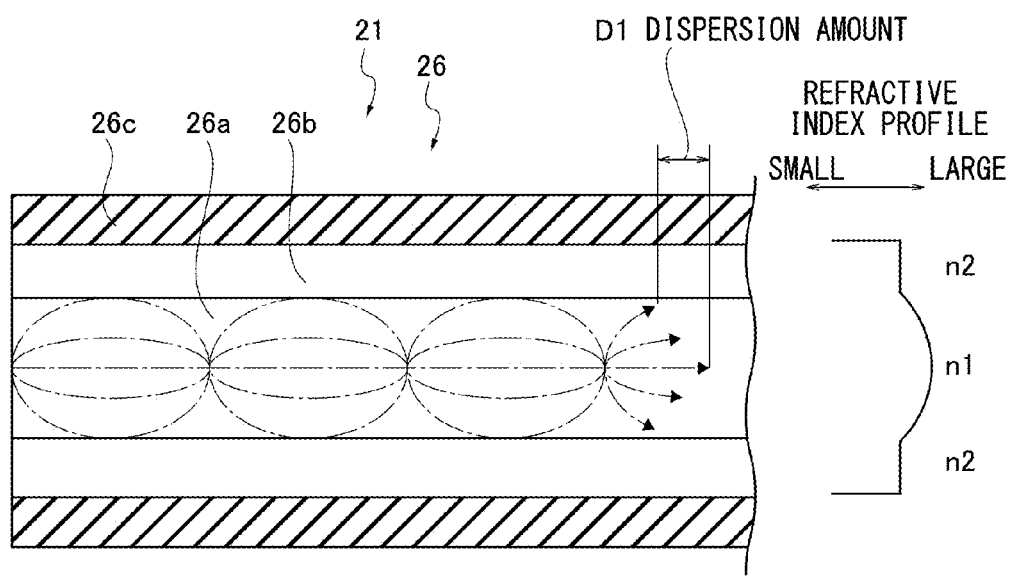
FIG. 3 shows the optical property of a GI fiber 26 of the optical path extender 21.
Figure 4:
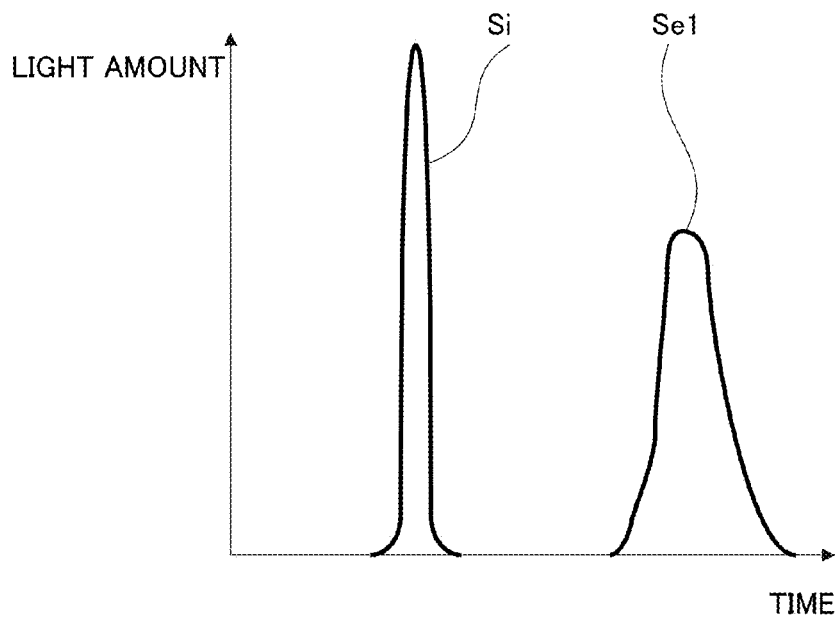
FIG. 4 is a graph showing the waveform of an input signal Si and an output signal Se1 of the GI fiber 26 relative to time.

Referring to FIG. 3, the GI fiber 26 includes a core 26a having a refractive index n1, a cladding 26b having a refractive index n2 (<n1) and surrounding the core 26a, and a cover 26c covering the cladding 26b. The distribution of the refractive index n1 is set such that the refractive index is largest at the center of the core 26a and gradually decreases toward outside radially, as shown in the profile in FIG. 3, aiming for the same propagation time in all modes. Thereby, the GI fiber 26 can reduce mode dispersion amount D1 of a guided optical signal. An input signal Si as a pulse wave is incident on one end of the GI fiber 26 and an output signal Se1 is exited from the other end. Thus, the GI fiber 26 can guide optical signals with no decrease in peak power and no deformation of waveforms. In the present embodiment the diameter of the core 26a is set to 100 μm, the diameter of the cladding 26b including the core 26a is set to 140 μm, and the numerical aperture (NA) of the core 26a is set to 0.29.

Figure 5:
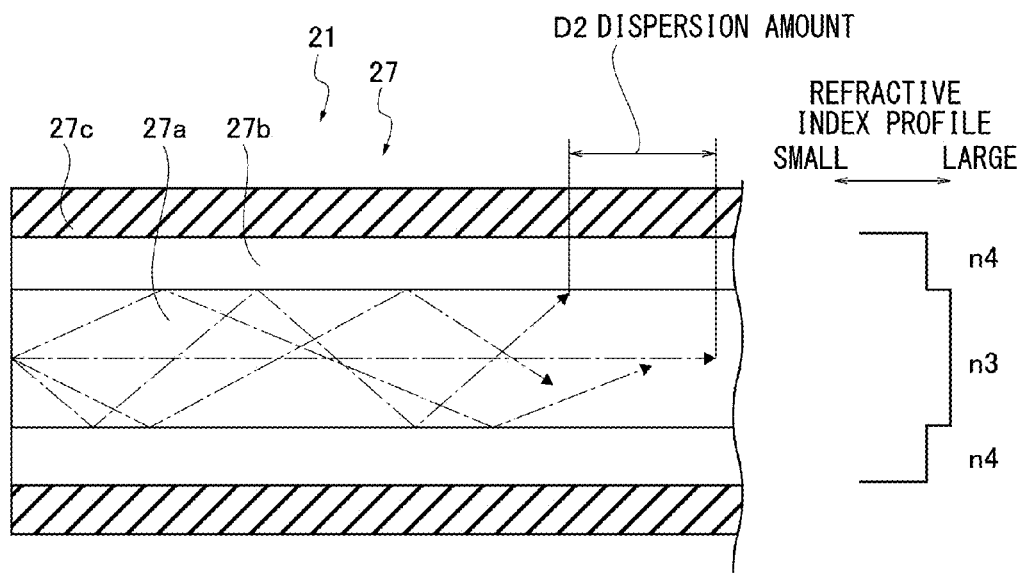
FIG. 5 shows the optical property of a SI fiber 27 of the optical path extender 21.
Figure 6:
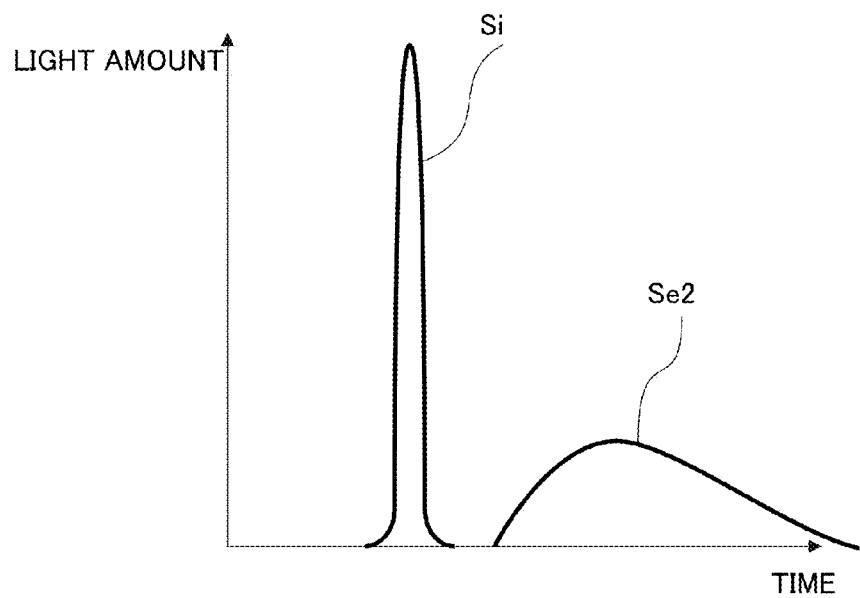
FIG. 6 is a graph showing the waveform of an input signal Si and an output signal Se2 of the SI fiber 27 relative to time.

Referring to FIG. 5, the SI fiber 27 includes a core 27a having a refractive index n3, a cladding 27b surrounding the core 27a and having a refractive index n4 (<n3), and a cover 27c covering the cladding 27b. The distribution of the refractive index n3 of the core 27a is set to be uniform irrespective of the position in a radial direction, as shown in the profile in FIG. 5. Thus, the mode dispersion amount D2 of a guided optical signal in the SI fiber 27 is larger than that D1 in the GI fiber 26 in FIG. 3. An input signal Si as a pulse wave is incident on the SI fiber 27 and an output signal Set is exited from the SI fiber 27, as shown in FIG. 6. The peak power of the guided optical signal is reduced from that of the output signal Se1 of the GI fiber 26 and more dispersed than the output signal Se1. In the present embodiment the diameter of the core 27a is set to 105 μm, the diameter of the cladding 27b including the core 27a is set to 125 μm, and the numerical aperture (NA) of the core 27a is set to 0.22.

Figure 2:
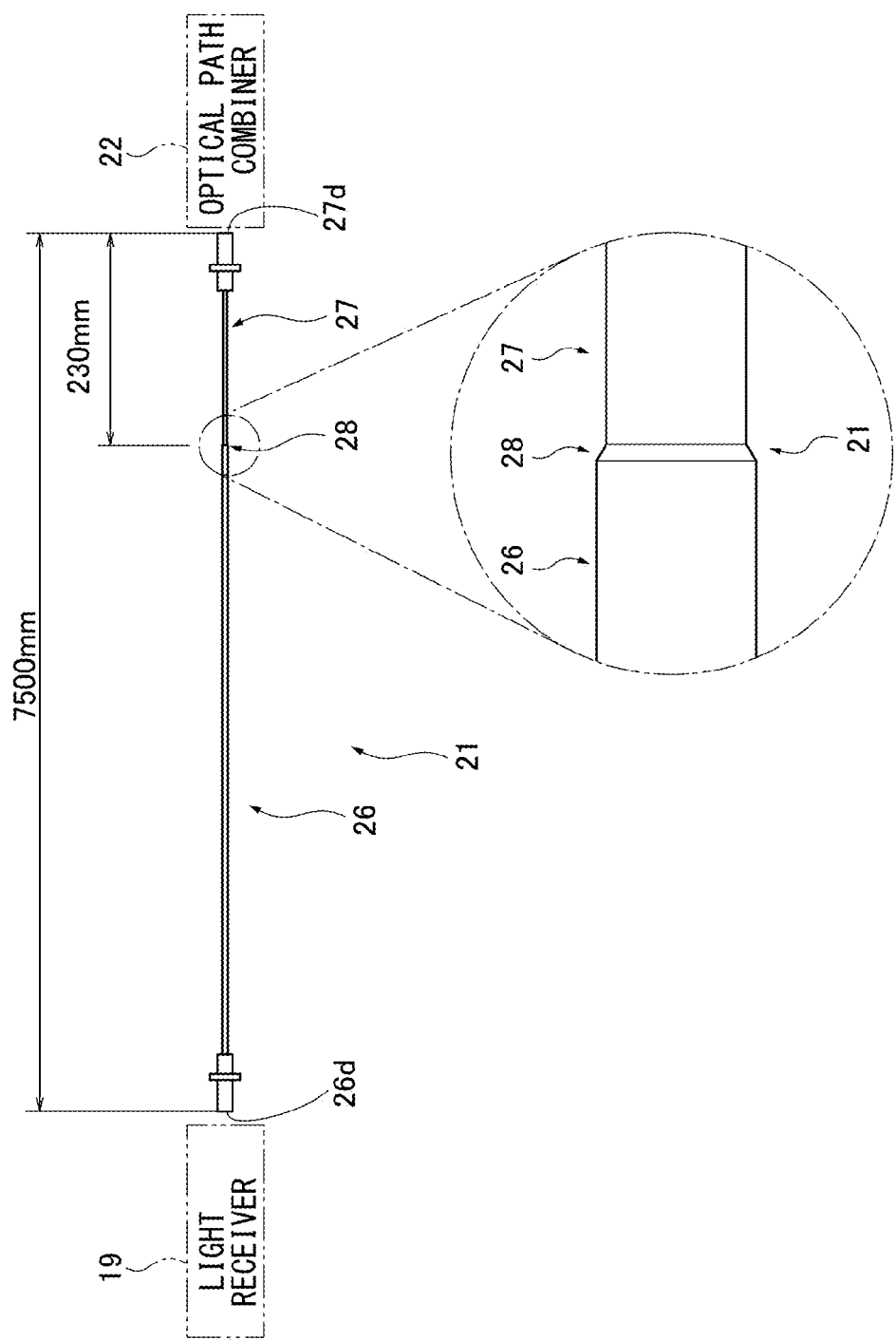
FIG. 2 schematically shows the structure of an optical path extender 21 of the electronic distance meter 10.

As shown in FIG. 2, the total length of the optical path extender 21 according to the present embodiment is set to 7,500 mm, the length of the SI fiber 27 is set to 230 mm, and the length of the GI fiber 26 is set to 7,270 mm. The GI fiber 26 and the SI fiber 27 are coupled with each other via a splice 28 which is formed by fusion bonding. The splice 28 can be arbitrarily structured as long as it can connect the GI fiber 26 and the SI fiber 27 through which optical signals are guided. For example, it can be a connector or an optical element, or the ends of the GI fiber 26 and SI fiber 27 can be simply attached to each other. It should not be limited to the above example.

In the optical path extender 21 the GI fiber 26 is provided on an incidence side adjacent to the light receiving system 19 and the SI fiber 27 is provided on an exit side adjacent to the optical path combiner 22. That is, the reflected pulsed light Pr is incident from the light receiving system 19 on an incidence end 26d of the GI fiber 26 and exited from an exit end 27d of the SI fiber 27. The incidence end 26d is placed at the focal position of the light receiving system 19 and the exit end 27d is placed at an incident position of the optical path combiner 22 from the optical path extender 21.

Thus, referring to FIG. 1, in the electronic distance meter 10 the reflected pulsed light Pr from the target object 11 is received and condensed by the objective lens 19a of the light receiving system 19 and incident on the incidence end 26d (FIG. 2) of the GI fiber 26 of the optical path extender 21. The reflected pulsed light Pr then is guided from the GI fiber 26 through the SI fiber 27 via the splice 28, exits from the exit end 27d to the optical path combiner 22, and is received by the light receiving element 23. Thereby, the electronic distance meter 10 can prevent a degradation of the light receiving signal Sr output from the light receiving element 23 in accordance with the reflected pulsed light Pr when the target object 11 is, for example, a reflecting prism which reflects an extremely large peak power of pulsed light Pr, as described in detail in the following.

The electronic distance meter 10 illuminates the target object 11 with a large peak power of the pulsed light Pm with a short pulse width (short pulse and high peak) for measuring the distance. Therefore, the electronic distance meter 10 can receive a sufficient peak power of reflected pulsed light Pr by the target object and precisely survey even if the target object is in a far distance. In other words, by use of a large peak power of the pulsed light with a short pulse width, the electronic distance meter 10 can extend measuring distance and conduct precise surveying based on the reflection by the target objet. For this purpose, it is preferable that the light receiving element 23 can receive the reflected pulsed light Pr without a reduction in peak power and deformation of waveforms. By use of the optical path extender 21 including the multi-mode graded index fiber, the reflected pulsed light Pr is guided to the optical path combiner 22 and received by the light receiving element 23. Thereby, the electronic distance meter 10 can precisely survey on the basis of the reflected pulsed light Pr by the target object in a far distance.

However, according to the electronic distance meter 10 as configured above, the light receiving element 23 receives an enormously large peak power of reflected pulsed light Pr without deformation of waveforms when the target object 11 is a reflecting prism generally used in surveying. Upon receiving a peak power exceeding an expected peak power, the light receiving signal Sr which the light receiving element 23 outputs in accordance with the received peak power is degraded. Especially, the use of a large peak power of the pulsed light Pm with a short pulse width causes an area having a locally large light amount on the cross section of the core of the graded index fiber, leading to local generation of large current on a portion of the light receiving surface of the light receiving element 23. Therefore, the light receiving signal Sr from the light receiving element 23 is likely to degrade. The electronic distance meter 10 cannot properly calculate the round-trip time of the pulsed light and measure the distance to the target object 11.

Meanwhile, since the optical path extender 21 is comprised of the GI fiber 26 and SI fiber 27 in combination (FIG. 2), the large peak power of the reflected pulsed light Pr can be reduced and diffused over the entire cross section of the core 27a in the SI fiber 27 having the large mode dispersion amount D2 (FIG. 5). Thus, even with a very large peak power of the reflected pulsed light Pr received at the light receiving system 19, the peak power of the reflected pulsed light Pr is decreased and dispersed all over the core 27a while guided through the GI fiber 26 and SI fiber 27 to the optical path combiner 22. Because of this, the electronic distance meter 10 can prevent degradation of the light receiving signal Sr output from the light receiving element 23 in accordance with the reflected pulsed light Pr when the target object 11 is a reflecting prism reflecting an extremely large peak power of pulsed light Pr.

Figure 7:
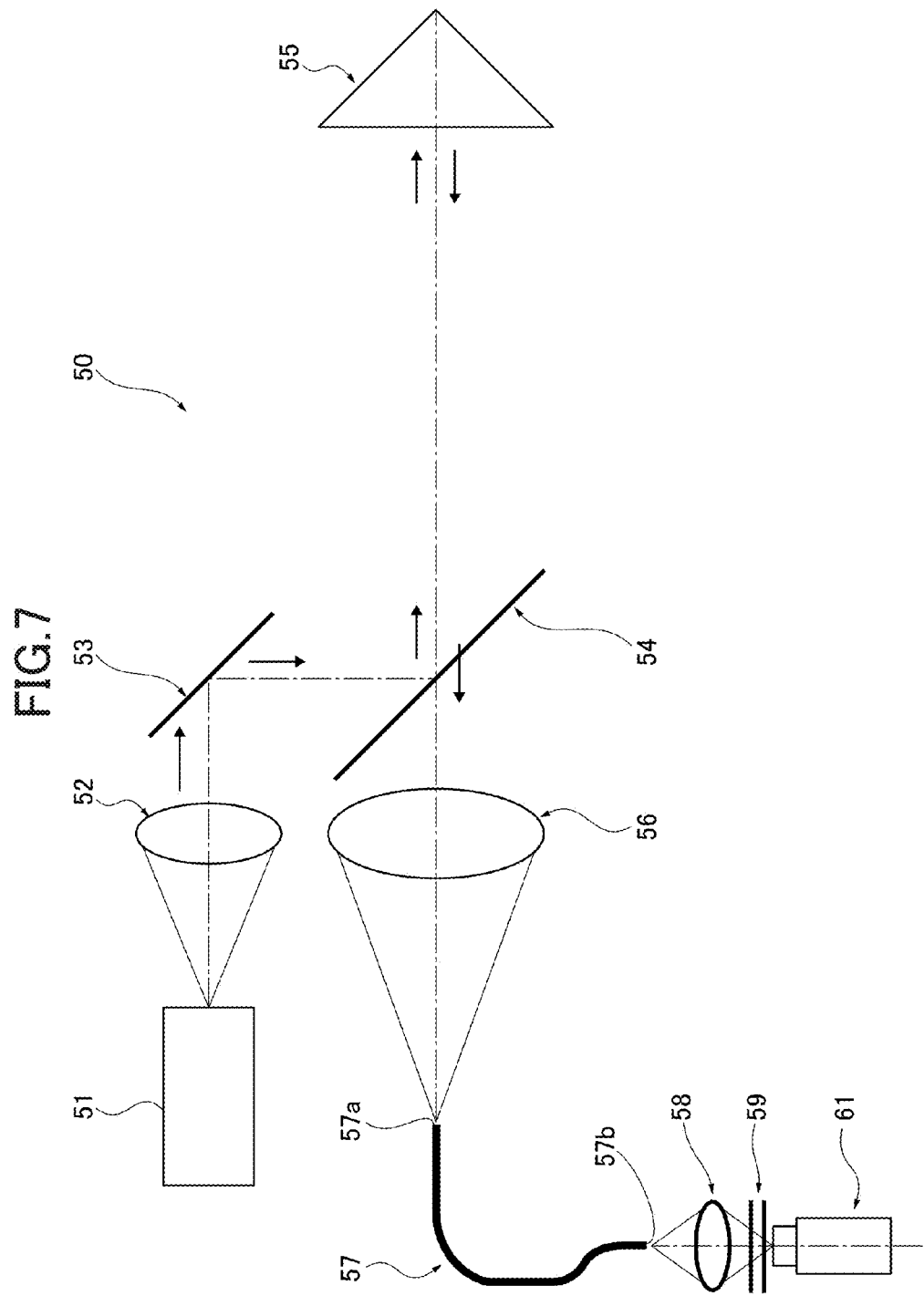
FIG. 7 schematically shows the structure of an experimental device 50.

The prevention of degradation of the light receiving signal Sr is verified with an experimental device 50, referring to FIG. 7. The experimental device 50 includes a laser emitter 51, a collimator 52, a reflecting mirror 53, a beam splitter 54, a reflecting prism 55, a light-receiving element 56, an optical guide 57, a condenser 58, a filter 59, and an imaging unit 61. Three kinds of the optical guide 57, first to third examples, are prepared. The first example is a multi-mode graded index fiber of 7.5 m, the second example is a multi-mode graded index fiber of 7.5 m and a multi-mode step index fiber of 1.0 m connected by fusion bonding, and the third example is a multi-mode graded index fiber of 7.5 m and a multi-mode step index fiber of 0.75 m connected by fusion bonding. The optical guide 57 is placed with an incidence end 57a located at the focal position of the light-receiving element 56 and an exit end 57b located at an object position of the condenser 58.

Figure 8A:
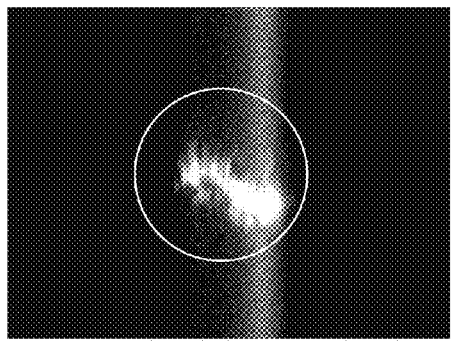
FIGS. 8A and 8B show the images of first and second examples captured by an imaging unit 61 of the experimental device 50.

In the experimental device 50 a laser beam is emitted from the laser emitter 51, converted into a parallel beam by the collimator 52, and reflected by the reflecting mirror 53 to the beam splitter 54. The laser beam is then reflected by the beam splitter 54 to the reflecting prism 55 and reflected back by the reflecting prism 55 to the beam splitter 54 and collected by the light-receiving element 56 through the beam splitter 54. Thereafter, the laser beam is incident on the incidence end 57a, guided through the optical guide 57 and exited from the exit end 57b, condensed by the condenser 58, and transmits through the filter 59. The condition of the laser beam is imaged by the imaging unit 61. FIGS. 8A, 8B and FIGS. 9A, 9B show the captured images of the first to third examples. Note that in the drawings, portions corresponding to the cores of the respective fibers at the exit ends 57b are indicated by circles and the higher the peak power of the laser beam, the brighter it appears. In FIGS. 8A and 9A vertically extending bright portions occur beyond the circles but they may be caused by smear on the imaging unit 61 and are irreverent of the peak power or brightness of the laser beam on the exit ends 57b. Further, in this verification with the experimental device 50, values obtained from the images captured by the imaging unit 61 as the peak power of the laser beam are normalized and used as the peak value of the light amount and a mean light amount.

Figure 8B:
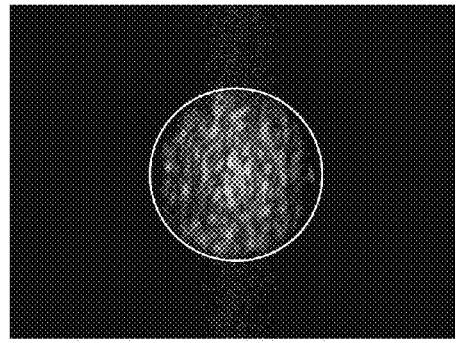
Figure 9A:
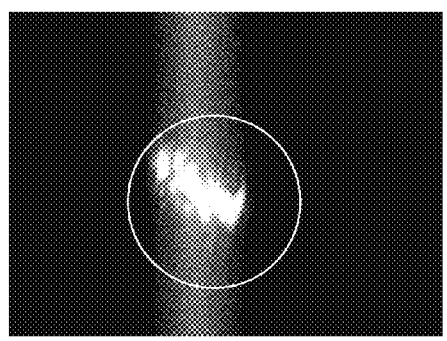
FIGS. 9A and 9B show the images of first and third examples captured by the imaging unit 61 of the experimental device 50.

FIGS. 8A, 8B show the images of the first and second examples, respectively. In the first example the peak value of the light amount is 868 and the mean light amount is 43.9 and it is seen from FIG. 8A that the light amount of the laser beam is locally heightened about the center of the core on the exit end 57b. Meanwhile, in the second example the peak value of the light amount is 164 and the mean light amount is 39.6 and it is seen from FIG. 8B that the light amount of the laser beam is evenly dispersed inside the core on the exit end 57b.

Figure 9B:
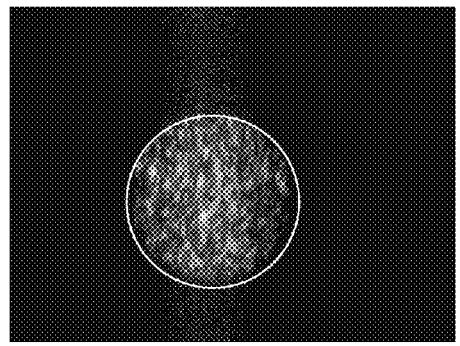

Likewise, FIGS. 9A, 9B show the images of the first and third examples, respectively. Note that the first example is imaged again for the purpose of comparing with the third example under the similar condition, so that the results of the first example in FIG. 8A and FIG. 9A are different. In the first example the peak value of the light amount is 872 and the mean light amount is 43.5 and it is seen from FIG. 9A that the light amount of the laser beam is locally heightened about the center of the core on the exit end 57b. Meanwhile, in the third example the peak value of the light amount is 192 and the mean light amount is 35.7 and it is seen from FIG. 9B that the light amount of the laser beam is evenly dispersed inside the core on the exit end 57b.

The results obtained with the experimental device 50 show that by use of the optical guide 57 of the first example made of only the multi-mode graded index fiber, the laser beam becomes uneven in the vicinity of the center and contains an area having an extremely large light amount. Meanwhile, by use of the optical guides 57 of the second and third examples made of the coupled multi-mode graded index fiber and multi-mode step index fiber, the light amount of the laser beam is evenly dispersed and the peak value of the light amount is greatly decreased. The second and third examples are structured same as the optical path extender 21 according to the present embodiment. Thus, it is found out that the electronic distance meter 10 can prevent degradation of the light receiving signal Sr output from the light receiving element 23 even if the target object 11 is an object such as a reflecting prism which reflects an extremely large peak power of pulsed light Pr, unlike an optical path extender 21 formed of the multi-mode graded index fiber alone.

Further, to disperse the laser beam in the optical guide 57, a mode scrambler can be also used. A mode scrambler can be formed by bending an optical fiber in waveform several times or helicoidally, for example. It can be an SI fiber or a GI fiber partially or entirely bending helicoidally or another kind of optical fiber helicoidally bent and connected with the SI or GI fiber. Further, it can be made of a multi-mode step index fiber, a multi-mode graded index fiber, or another optical fiber.

In view of this, another three examples of the optical guide 57 of the experimental device 50 in FIG. 7 are prepared. A fourth example is a multi-mode graded index fiber of 7.5 m with a mode scrambler partially or entirely bent spirally. A fifth example is a multi-mode graded index fiber of 7.5 m and a multi-mode step index fiber of 7.5 m coupled with each other by fusion bonding. A sixth example is a multi-mode graded index fiber of 7.5 m and a multi-mode step index fiber with a mode scrambler partially or entirely bent spirally, which are coupled by fusion bonding. The mode scramblers of the fourth and sixth examples are about 50 mm in length. FIGS. 10A to 10D and FIG. 11A to 11D show the images of the first and fourth to sixth examples captured by the imaging unit 61, as in FIGS. 8A to 9B.

FIGS. 10A to 10D show the images when the center of the reflecting prism 55 is collimated or positioned on the optical axis from the light-receiving element 56 to the optical guide 57. FIGS. 11A to 11D show the images captured when the collimated position is shifted from the center to receive the highest peak power. In the drawings the cores of the respective fibers at the exit ends 57b are indicated by circles and the higher the peak power of the laser beam, the brighter it appears, as in FIGS. 8A to 9B.

When the center of the reflecting prism 55 is collimated, in the first and fourth examples of FIGS. 10A, 10B the light amount of the laser beam is locally heightened in the vicinity of the center of the core on the exit end 57b. In the fifth and sixth examples of FIGS. 10C, 10D the light amount of the laser beam is evenly dispersed inside the core on the exit end 57b.

Further, when the collimated position is shifted to attain the highest peak power, in the first and fourth examples of FIGS. 11A, 11B the light amount of the laser beam is locally heightened in the vicinity of the center of the core on the exit end 57b. In the fifth and sixth examples of FIGS. 11C, 11D the light amount of the laser beam is evenly dispersed inside the core on the exit end 57b.

It is found from the above that with or without the mode scrambler partially or entirely provided in the multi-mode graded index fiber, it is difficult to prevent a local increase in the peak power of the laser beam. Meanwhile, the coupled multi-mode graded index fiber and multi-mode step index fiber of the fifth and sixth examples can disperse the laser beam evenly and lower the peak value of the light amount substantially irrespective of presence or absence of the mode scrambler. The fifth example is structured same as the optical path extender 21 of the electronic distance meter 10. The sixth example is the optical path extender 21 having the mode scrambler added. Thus, the electronic distance meter 10 can prevent degradation of the light receiving signal Sr output from the light receiving element 23 even if the target object 11 is an object such as a reflecting prism which reflects an extremely large peak power of pulsed light Pr, unlike an optical path extender 21 formed of the multi-mode graded index fiber having the mode scrambler. According to the present embodiment, the optical path extender 21 can additionally include a mode scrambler in addition to the GI fiber 26 and SI fiber 27 coupled with each other or can be connected with a mode scrambler of another optical fiber.

Next, a necessary length of the SI fiber 27 of the optical path extender 21 to achieve the above effects is found out. First, it is preferable that the light receiving element 23 receive the reflected pulsed light Pr without a reduction in the peak power or a deformation of waveforms for the purpose of accurately acquiring a difference in time at which reflected pulsed light Pr is received and at which reference pulsed light Pi is received. In view of this, according to the electronic distance meter 10 it is needed to limit the width of a waveform of the reflected pulsed light Pr from the SI fiber 27 to an allowable value which enables the accurate calculation of the difference in time. The width of the waveform of the reflected pulsed light Pr can be represented by a difference in time τ based on the propagation speed of the SI fiber 27, as follows:

$$\tau = L \times (n3 - n4)/C$$

where L is the length of the SI fiber 27, n3 is a refractive index of the core 27a, n4 is a refractive index of the cladding 27b (FIG. 5), and C is light speed.

Thus, the upper limit of the length of the SI fiber 27 of the optical path extender 21 is set to satisfy the above expression.

Figure 12:
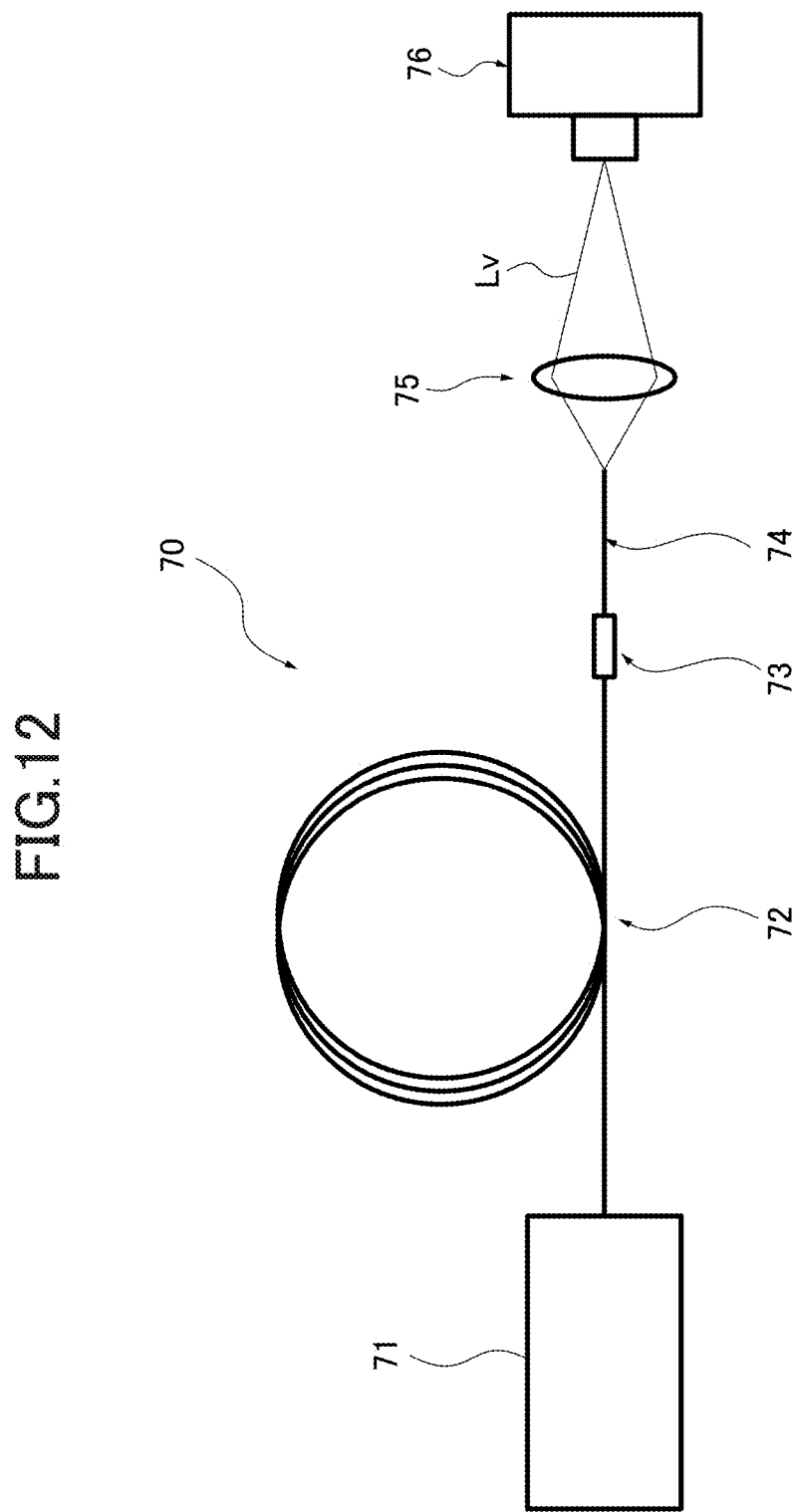
FIG. 12 schematically shows the structure of a testing device 70.

As described above, the SI fiber 27 of the optical path extender 21 functions to decrease and disperse the waveform of the reflected pulsed light Pr. In view of this, the lower limit of the length of the SI fiber 27 necessary to achieve the function is found out with a testing device 70, as shown in FIG. 12.

Among possible target objects, a reflecting prism generally used in surveying is considered to reflect the largest peak power of the pulsed light Pr. The testing device 70 measures the peak power of light Lv corresponding to the peak power of the reflected pulsed light Pr by the reflecting prism. The testing device 70 includes a light emitter 71, a GI fiber 72, a splice 73, a SI fiber 74, a condenser lens 75, and an imaging unit 76.

According to the present embodiment the light emitter 71 is a super luminescent diode (SLD) to emit the light Lv of 1.2 mW having a central wavelength of 980 nm, and a line width (frequency width) of ±10 nm. The condenser lens 75 condenses the light Lv emitted from the light emitter 71 and transmitting through the SI fiber 74. In the testing device 70 the light Lv from the light emitter 71 transmits through the GI fiber 72, splice 74, and SI fiber 75, and is condensed by the condenser lens 75. The condition of the light Lv is captured by the imaging unit 76.

The GI fiber 72, splice 73, and SI fiber 74 of the testing device 70 correspond to the GI fiber 26 and SI fiber 27 connected via the splice 28 of the optical path extender 21 of the electronic distance meter 10. In the present embodiment the length of the GI fiber 72 is 7,500 mm, the diameter of the core is 100 µm, the diameter of the cladding is 140 µm, and the numerical aperture of the core is 0.29. The diameter of the core of the SI fiber 74 is 105 µm, the diameter of the cladding is 125 µm, and the numerical aperture of the core is 0.22. The GI fiber 72 and SI fiber 74 are coupled at the splice 73 by fusion bonding. The length of the SI fiber 74 is gradually shortened from 500 mm to decide a sufficient lower limit.

FIG. 13A to FIG. 15C show the images captured by the imaging unit 76. In the drawings the area corresponding to the core on the exit end of the SI fiber 74 is indicated by circles and the larger the amount of light Lv, the whiter it appears. Further, vertically extending bright portions beyond the circles and bright portions surrounding the circles occur in the drawings but they may be caused by smear on the imaging unit 76 and are irreverent of the peak power or brightness of the light Lv on the exit end of the SI fiber 74.

Figure 13A:
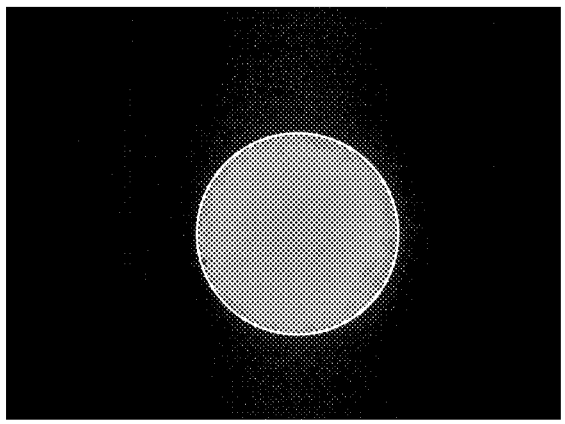
FIGS. 13A to 13C show the images of a SI fiber 74 captured by an imaging unit 76 of the testing device 70 when the length of the SI fiber 74 is changed to 500 mm, 400 mm, and 300 mm.
Figure 13B:
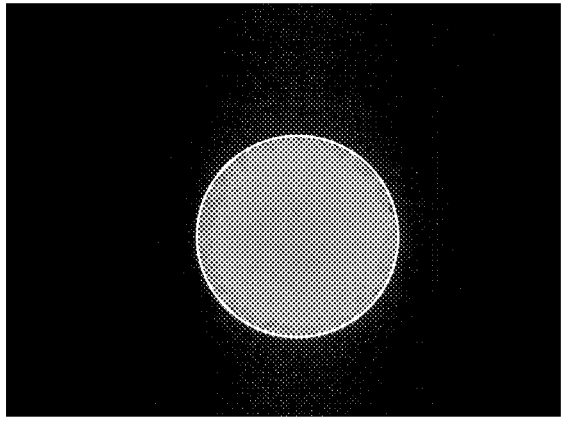
Figure 13C:
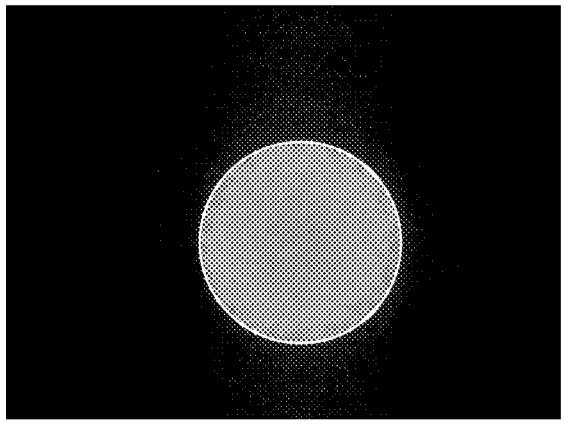
Figure 14A:
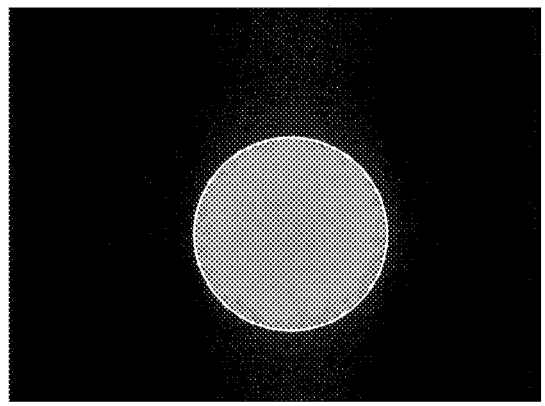
FIGS. 14A to 14C show the images of the SI fiber 74 captured by the imaging unit 76 of the testing device 70 when the length of the SI fiber 74 is changed to 200 mm, 100 mm, and 50 mm.
Figure 14B:
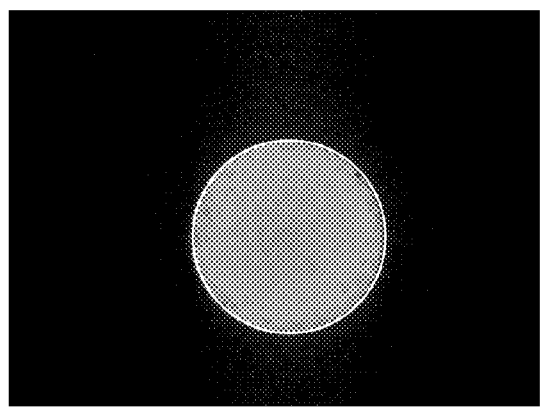
Figure 14C:
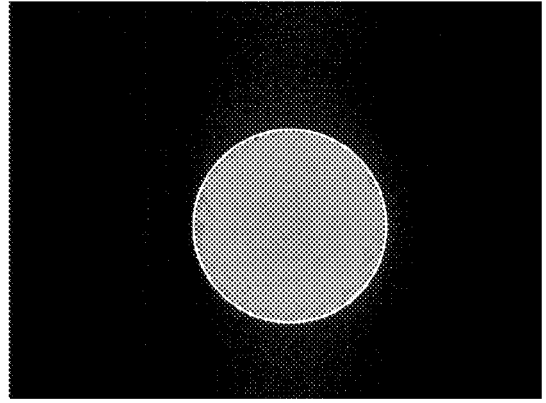
Figure 15A:
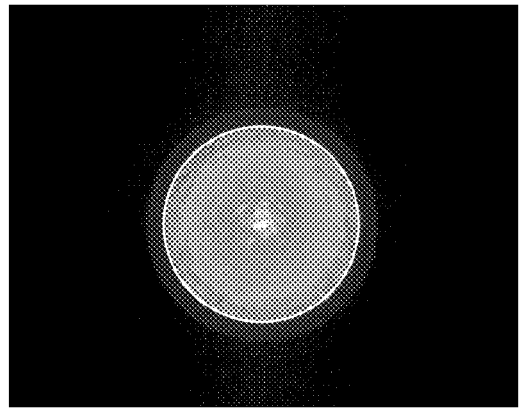
FIGS. 15A to 15C show the images of the SI fiber 74 captured by the imaging unit 76 of the testing device 70 when the length of the SI fiber 74 is changed to 40 mm, 30 mm, and 20 mm.
Figure 15B:
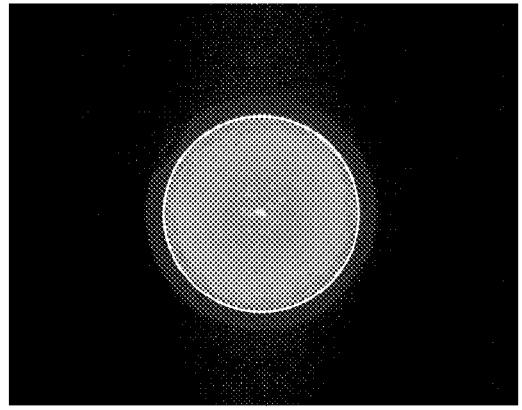
Figure 15C:
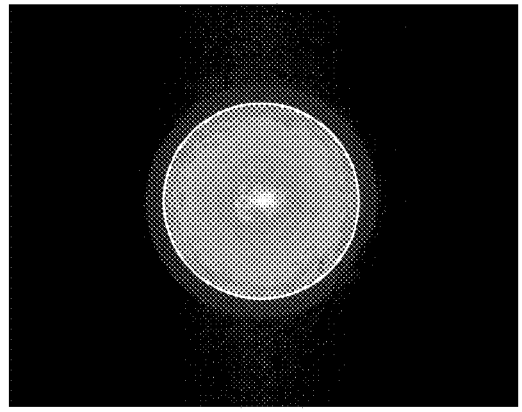

FIGS. 13A to 13C show the images captured when the length of the SI fiber 74 is 500 mm, 400 mm, and 300 mm, respectively. FIGS. 14A to 14C show the images captured when the length of the SI fiber 74 is 200 mm, 100 mm, and 50 mm, respectively. FIGS. 15A to 15C show the images captured when the length of the SI fiber 74 is 40 mm, 30 mm, and 20 mm, respectively. The images in FIG. 13A to 15C differently appear from the images in FIGS. 8A to 11D because the light emitter 71 is an SLD with a broad oscillation wavelength width.

Referring to FIGS. 13A to 13C and FIGS. 14A to 14C, the light amount of the laser beam is evenly dispersed in the SI fiber 74 in length between 500 mm to 300 mm and between 200 mm to 50 mm. However, when the length of the SI fiber 74 is 40 mm, 30 mm, and 20 mm, the light amount of the laser beam is locally increased adjacent to the center of the core, as shown in FIGS. 15A to 15C.

That is, it is understood that the SI fiber 74 in length of 50 mm can sufficiently disperse the light amount not to degrade the light receiving signal Sr output from the light receiving element 23. The SI fibers 74 in lengths of 40 mm, 30 mm, and 20 mm cause a local increase in the light amount of the laser beam, which degrades the light receiving signal Sr from the light receiving element 23. From the testing results, the lower limit of the length of the SI fiber 27 of the optical path extender 21 is set to about 50 mm. Accordingly, in the electronic distance meter 10 the optical path extender 21 including the GI fiber 26 coupled with the SI fiber 27 in length of 50 mm or more can properly reduce and disperse an extremely large peak power of the reflected pulsed light Pr by the target object 11 and prevent a degradation of the light receiving signal Sr from the light receiving element 23. The electronic distance meter 10 can properly deal with an extremely large peak power of reflected pulsed light Pr and precisely measure the distance to the target object 11 having generated the reflected pulsed light Pr.

The electronic distance meter 10 according to the present embodiment includes the optical path extender 21 made of the coupled GI fiber 26 and SI fiber 27 as optical guide which receives the reflected pulsed light Pr from the light receiving system 19 and guides it to the light receiving element 23. The SI fiber 27 of the optical path extender 21 can guide the reflected pulsed light Pr to the light receiving element 23 while reducing and dispersing the peak power. Thereby, the electronic distance meter 10 can prevent degradation of the light receiving signal Sr output from the light receiving element 23 in accordance with the reflected pulsed light Pr even when the target object 11 generates an extremely large peak power of reflected pulsed light Pr.

Further, owing to the combination of the GI fiber 26 and the SI fiber 27, the optical path extender 21 can guide optical signals without a reduction in the peak power and a deformation of waveforms in the GI fiber 26. Thereby, the electronic distance meter 10 can precisely measure distances from the reflected pulsed light Pr.

Further, the electronic distance meter 10 can prevent a change in waveforms over long transmission distances, and prevent a degradation of the light receiving signal Sr output from the light receiving element 23 even when an extremely large peak power of the reflected pulsed light Pr is received. Thus, the electronic distance meter 10 can enhance distance-measuring precision while preventing a degradation of the light receiving signal Sr from the light receiving element 23.

Further, according to the electronic distance meter 10 the optical path extender 21 as an optical guide can be very simply structured of the coupled GI fiber 26 and SI fiber 27.

Further, the optical path extender 21 receives the reflected pulsed light from the light receiving system 19 and guides it to the light receiving element 23. Owing to the combination of the GI fiber 26 and the SI fiber 27, the electronic distance meter 10 can adjust the peak power of the reflected pulsed light Pr which may greatly changes depending on a kind of the target object 11 by properly dispersing it without deforming the waveform, so as to have the light receiving element 23 receive a correct peak power of the reflected pulsed light Pr. Thus, the electronic distance meter 10 can enhance distance-measuring precision while preventing a degradation of the light receiving signal Sr from the light receiving element 23.

According to the electronic distance meter 10, the GI fiber 26 forms the incidence end 26d from the light receiving system 19 and the SI fiber 27 forms the exit end 27d to the light receiving element 23. Thus, the reflected pulsed light Pr is guided through the GI fiber 26 first without a peak power reduction and a waveform deformation and then is guided through the SI fiber 27 while being reduced in peak power and dispersed. Thereby, the peak power of the reflected pulsed light Pr can be appropriately adjusted. Accordingly, the electronic distance meter 10 can enhance distance-measuring precision while preventing a degradation of the light receiving signal Sr from the light receiving element 23.

In the electronic distance meter 10 the lower limit of the length of the SI fiber 27 is set to approximately 50 mm. Thereby, the electronic distance meter 10 can prevent the degradation of the light receiving signal Sr output from the light receiving element 23 even when the target object 11 is a reflecting prism which reflects the largest peak power of light among possible target objects. Thus, the electronic distance meter 10 can accurately measure the distance to the target object 11 irrespective of a kind of the target object 11.

Further, in the electronic distance meter 10 the optical path extender 21 is formed to extend the optical path length from the light receiving system 19 to the light receiving element 23 and delay the time at which the reflected pulsed light Pr reaches the light receiving element 23 from the light receiving system 19. Even when the optical path length is extended, the length of the GI fiber 26 can be adjusted to have the light receiving element 23 receive a correct peak power of the reflected pulsed light Pr without peak power reduction and waveform deformation. The electronic distance meter 10 can prevent a reduction in the peak power of the reflected pulsed light Pr received by the light receiving system 19 and properly delay the time at which the reflected pulsed light Pr reaches the light receiving element 23. Thus, it can more accurately measure the distance to the target object 11.

Further, the electronic distance meter 10 includes two different optical paths, that is, the internal reference optical path 18 for guiding the pulsed light Pm to the light receiving element 23 and the optical guide path as the optical path extender 21 made of the GI fiber 26 and the SI fiber 27. Although the peak power of the reflected pulsed light Pr received by the light receiving system 19 varies depending on a kind of the target object 11, the optical path extender 21 can adjust the peak power and waveform of the reflected pulsed light Pr properly, as described above. By using both the reflected pulsed light Pr from the optical guide path and the reference pulsed light Pi from the internal reference optical path 18, the electronic distance meter 10 can accurately and properly measure the distance to the target object 11.

Further, the optical path extender 21 is a very simple structure of the combination of the GI fiber 26 and the SI fiber 27. With a simple structure, the electronic distance meter 10 can improve distance-measuring precision and prevent a degradation of the light receiving signal Sr output from the light receiving element 23.

Accordingly, the electronic distance meter 10 can properly deal with an extremely large peak power of reflected light and precisely measure the distance to the target object 11.

The electronic distance meter according to the present embodiment should not be limited to the electronic distance meter 10 described above and can be arbitrarily configured as long as the electronic distance meter includes an optical unit which emits light to a target object and receives the light reflected by the target object with a light receiving element, a measuring unit which calculates a length of round-trip time taken for the light to make a round trip to the target object and measures a distance to the target object according to the round-trip time of the received light, a light receiving system which receives and condenses the light reflected by the target object, and an optical guide which guides the light condensed by the light receiving element to the light receiving system, including a multi-mode graded index fiber and a multi-mode step index fiber coupled with each other.

Further, the above embodiment has described an example where the optical path extender 21 includes the GI fiber 26 and SI fiber 27 coupled by fusion bonding. The optical path extender 21 can be arbitrarily structured as long as it is made of the combination of a multi-mode graded index fiber and a multi-mode step index fiber to guide the reflected light condensed by the light receiving system 19 to the light receiving element 23.

Further, the above embodiment has described an example where the GI fiber 26 forms the incidence end 26d from the light receiving system 19 and the SI fiber 27 forms the exit end 27d to the light receiving element 23. The optical path extender 21 can be arbitrarily structured and should not be limited to such an example. Alternatively, the SI fiber 27 can form the incidence end from the light receiving system 19 and the GI fiber 26 can form the exit end to the light receiving element 23. In this case the reflected pulsed light Pr is guided through the SI fiber 27 first while being reduced in peak power and dispersed and then is guided through the GI fiber 26 without a peak power reduction and a waveform deformation. Thus, the electronic distance meter can improve distance-measuring precision and prevent a degradation of the light receiving signal Sr output from the light receiving element 23.

The above embodiment has described an example where the optical path extender 21 includes the coupled GI fiber 26 to the SI fiber 27 to extend the optical path length from the light receiving system 19 and the light receiving element 23. However, the optical path extender can be arbitrarily structured as long as the optical guide path is formed of the GI fiber 26 and the SI fiber 27 to guide reflected pulsed light Pr from the light receiving system 19 to the light receiving element 23.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An electronic distance meter comprising:
    an optical unit which emits light to a target object and receives the light reflected by the target object with a light receiving element;
    a measuring unit which calculates a length of round-trip time taken for the light to make a round trip to the target object and measures a distance to the target object according to the round-trip time of the received light;
    a light receiving system which receives and condenses the light reflected by the target object; and
    an optical guide which guides the light condensed by the light receiving element to the light receiving system, including a multi-mode graded index fiber and a multi-mode step index fiber coupled with each other wherein
    in the optical guide the multi-mode graded index fiber forms an incidence end from the light receiving system and the multi-mode step index fiber forms an exit end to the light receiving element, and
    a mode dispersion amount of the light in the multi-mode step index fiber is larger than a mode dispersion amount of the light in the multi-mode graded index fiber.

2. The electronic distance meter according to claim 1, wherein
    a lower limit of a length of the multi-mode step index fiber is set to approximately 50 mm.

3. The electronic distance meter according to claim 1, wherein
    the optical guide functions as an optical path extender which extends an optical path length from the light receiving system to the light receiving element to delay a length of time taken for the light to travel from the light receiving system to the light receiving element.

4. The electronic distance meter according to claim 1, further comprising
    an internal reference optical path which guides the light to the light receiving element not to illuminate the target object.

* * * * *